US011290995B2

United States Patent
Hwang et al.

(10) Patent No.: US 11,290,995 B2
(45) Date of Patent: Mar. 29, 2022

(54) METHOD AND WIRELESS DEVICE FOR MONITORING DOWNLINK CHANNEL OR DOWNLINK SIGNAL USING POWER SAVING SIGNAL

(71) Applicant: LG Electronics Inc., Seoul (KR)

(72) Inventors: Seunggye Hwang, Seoul (KR); Joonkui Ahn, Seoul (KR); Changhwan Park, Seoul (KR)

(73) Assignee: LG Electronics Inc., Seoul (KR)

(*) Notice: Subject to any disclaimer, the term of this patent is extended or adjusted under 35 U.S.C. 154(b) by 72 days.

(21) Appl. No.: 16/650,787

(22) PCT Filed: Sep. 20, 2018

(86) PCT No.: PCT/KR2018/011088
§ 371 (c)(1),
(2) Date: Mar. 25, 2020

(87) PCT Pub. No.: WO2019/059657
PCT Pub. Date: Mar. 28, 2019

(65) Prior Publication Data
US 2020/0245303 A1    Jul. 30, 2020

Related U.S. Application Data

(60) Provisional application No. 62/626,630, filed on Feb. 5, 2018, provisional application No. 62/562,504, filed on Sep. 25, 2017.

(30) Foreign Application Priority Data

Apr. 5, 2018  (KR) .................. 10-2018-0039868
May 10, 2018 (KR) .................. 10-2018-0053888
Aug. 8, 2018  (KR) .................. 10-2018-0092140

(51) Int. Cl.
*H04W 72/04* (2009.01)
*H04W 76/28* (2018.01)
(Continued)

(52) U.S. Cl.
CPC ......... *H04W 72/042* (2013.01); *H04W 76/28* (2018.02); *H04W 84/18* (2013.01); *H04W 88/02* (2013.01)

(58) Field of Classification Search
CPC ..................... H04W 72/042; H04W 76/28
See application file for complete search history.

(56) References Cited

U.S. PATENT DOCUMENTS

| 8,098,613 B2* | 1/2012 | Bi ................. H04B 7/185 |
| 2011/0076964 A1* | 3/2011 | Dottling ............ H04B 7/00 |

(Continued)

FOREIGN PATENT DOCUMENTS

| EP | 3672313 | 6/2020 |
| WO | WO2015/180085 | 12/2015 |

OTHER PUBLICATIONS

EP Extended European Search Report in European Appln. No. 18857725.8, dated May 25, 2021, 9 pages.

(Continued)

*Primary Examiner* — Ronald B Abelson
(74) *Attorney, Agent, or Firm* — Fish & Richardson P.C.

(57) ABSTRACT

According to one embodiment of the present specification, provided is a method for monitoring a downlink channel or a downlink signal by means of a wireless device. The method may comprise the steps of: receiving a power saving signal from a serving cell; and monitoring a subsequent downlink channel or downlink signal based on the reception of the power saving signal. The size of a transmission unit (Continued)

of the power saving signal may be determined based on setup information. The setup information may be received from the serving cell.

14 Claims, 21 Drawing Sheets

(51) Int. Cl.
*H04W 84/18* (2009.01)
*H04W 88/02* (2009.01)

(56) References Cited

U.S. PATENT DOCUMENTS

| | | |
|---|---|---|
| 2012/0275366 A1 | 11/2012 | Anderson et al. |
| 2014/0112226 A1* | 4/2014 | Jafarian ................ H04W 52/02 |
| 2015/0126206 A1 | 5/2015 | Krishnamurthy et al. |
| 2016/0142974 A1 | 5/2016 | Lindoff et al. |
| 2016/0212708 A1 | 7/2016 | Kim et al. |
| 2018/0279274 A1* | 9/2018 | Sun ........................ H04W 72/04 |
| 2018/0332533 A1* | 11/2018 | Bhattad ................ H04W 52/02 |

OTHER PUBLICATIONS

Huawei & HiSilicon, "Consideration and evaluation on power saving signal in NB-IoT," R1-1712113, Presented at 3GPP TSG RAN WG1 Meeting #90, Prague, Czech Republic, Aug. 21-25, 2017, 15 pages.

Sony, "NB-IoT UE Power Consumption Reduction in Idle Mode Paging," R1-1705203, Presented at 3GPP TSG RAN WG1 Meeting #88bis, Spokane, USA Apr. 3-7, 2017, 4 pages.

* cited by examiner

METHOD AND WIRELESS DEVICE FOR MONITORING DOWNLINK CHANNEL OR DOWNLINK SIGNAL USING POWER SAVING SIGNAL

CROSS-REFERENCE TO RELATED APPLICATIONS

This application is a National Stage application under 35 U.S.C. § 371 of International Application No. PCT/KR2018/011088, filed on Sep. 20, 2018, which claims the benefit of U.S. Provisional Application No. 62/562,504, filed on Sep. 25, 2017, 62/626,630, filed on Feb. 5, 2018, Korean Patent Application Nos. 10-2018-0039868, filed on Apr. 5, 2018, 10-2018-0053888, filed on May 10, 2018, and 10-2018-0092140, filed on Aug. 8, 2018. The disclosures of the prior applications are incorporated by reference in their entirety.

BACKGROUND

Field of the Disclosure

The present disclosure relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

A physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile recently, Internet of Things (IoT) communication has been attracted. The IoT refers to communications that do not involve human interaction. A discussion is beginning to be made to accommodate such IoT communications in a cellular-based LTE system.

However, since the existing LTE system has been designed for the purpose of supporting high-speed data communication, it has been regarded as an expensive communication method.

However, IoT communication can be widely used only if the price is low due to its characteristics.

Thus, there have been discussions to reduce bandwidth as part of cost savings. This is referred to as a NB (narrow band) IoT.

A general UE blind-decodes a PDCCH in on periods according to discontinuous reception (DRX). However, NB-IoT devices may not frequently transmit/receive data due to characteristics thereof. Accordingly, it may be inefficient to frequently monitor a PDCCH in on periods according to DRX.

SUMMARY OF THE DISCLOSURE

Accordingly, a disclosure of the present specification has been made in an effort to solve the aforementioned problem.

Specifically, an object of a disclosure of the present specification is to provide a method for maximizing energy efficiency of NB-IoT devices.

To accomplish the object, an aspect of the present specification provides a method for monitoring a downlink channel or a downlink signal. The method may be performed by a wireless device and include receiving a power saving signal from a serving cell, and monitoring a subsequent downlink channel or a downlink signal based on reception of the power saving signal. A transmission unit size of the power saving signal may be determined based on configuration information. The configuration information may be received from the serving cell.

The configuration information may include at least one of a number of repetitions of the power saving signal and a number of pieces of information representable by the power saving signal.

The information representable by the power saving signal may include at least one of an identifier of the wireless device, a group identifier of the wireless device, and a cell identifier.

Cover code may be applied to a transmission unit of the power saving signal.

The method may further include determining an actual transmission duration of the power saving signal based on the transmission unit of the power saving signal.

The transmission unit of the power saving signal may be determined based on a total transmission length of the power saving signal.

The information representable by the power saving signal may include information about positions, a number, and duration of paging occasions (POs).

The transmission unit of the power saving signal may include a plurality of power saving signals.

Cover code may be applied to the plurality of power saving signals in the transmission unit.

To accomplish the object, an aspect of the present specification provides a wireless device for monitoring a downlink channel or a downlink signal. The wireless device may include a transceiver for receiving a power saving signal from a serving cell, and a processor for controlling the transceiver and monitoring a subsequent downlink channel or a downlink signal based on reception of the power saving signal. A transmission unit size of the power saving signal may be determined based on configuration information. The configuration information may be received from the serving cell.

According to the disclosure of the present specification, the problem of the conventional technology described above may be solved.

DESCRIPTION OF EXEMPLARY EMBODIMENTS

Figure 1:
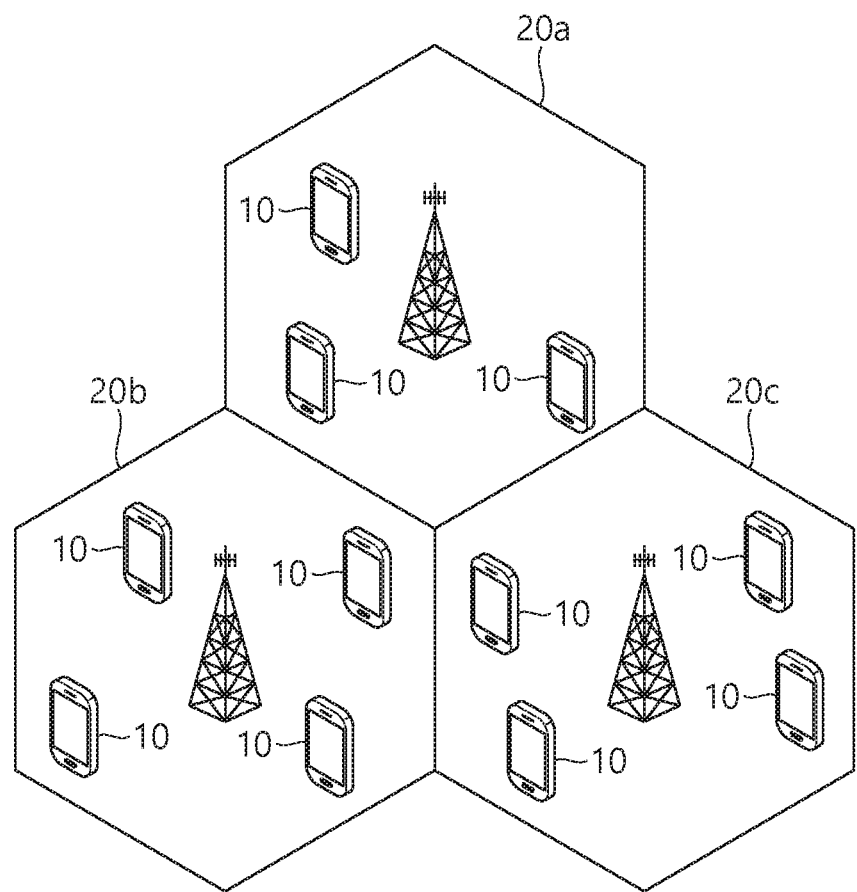
FIG. 1 is a wireless communication system.

Hereinafter, based on 3rd Generation Partnership Project (3GPP) long term evolution (LTE) or 3GPP LTE-advanced (LTE-A), the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
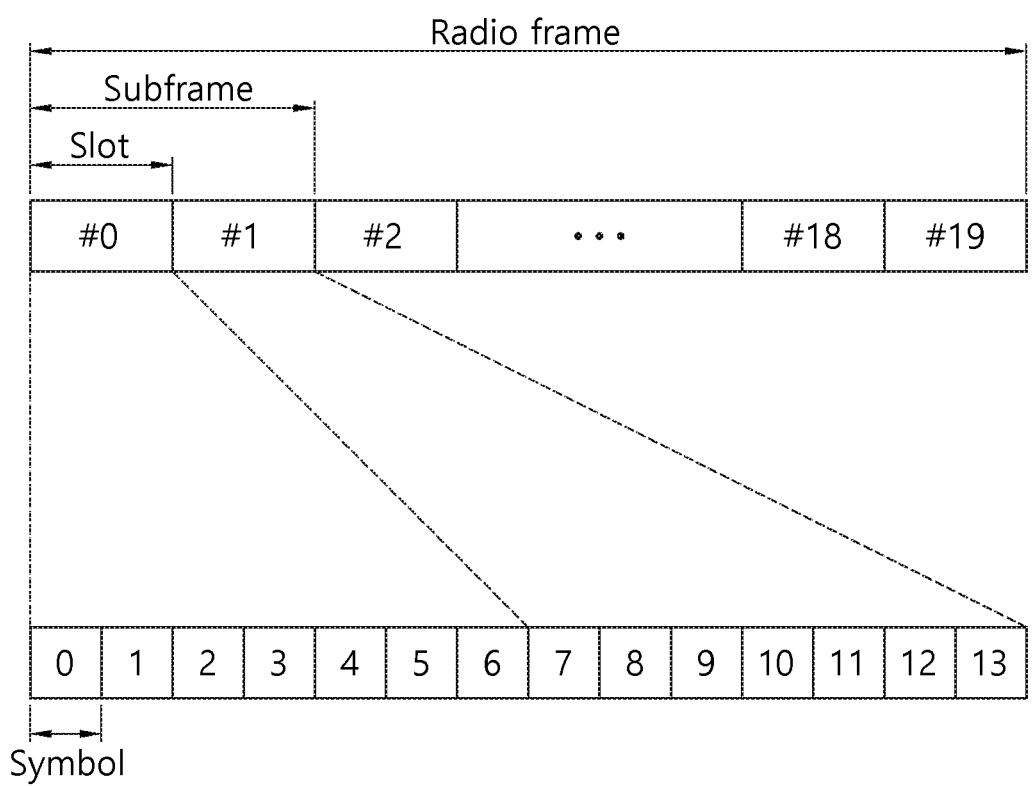
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
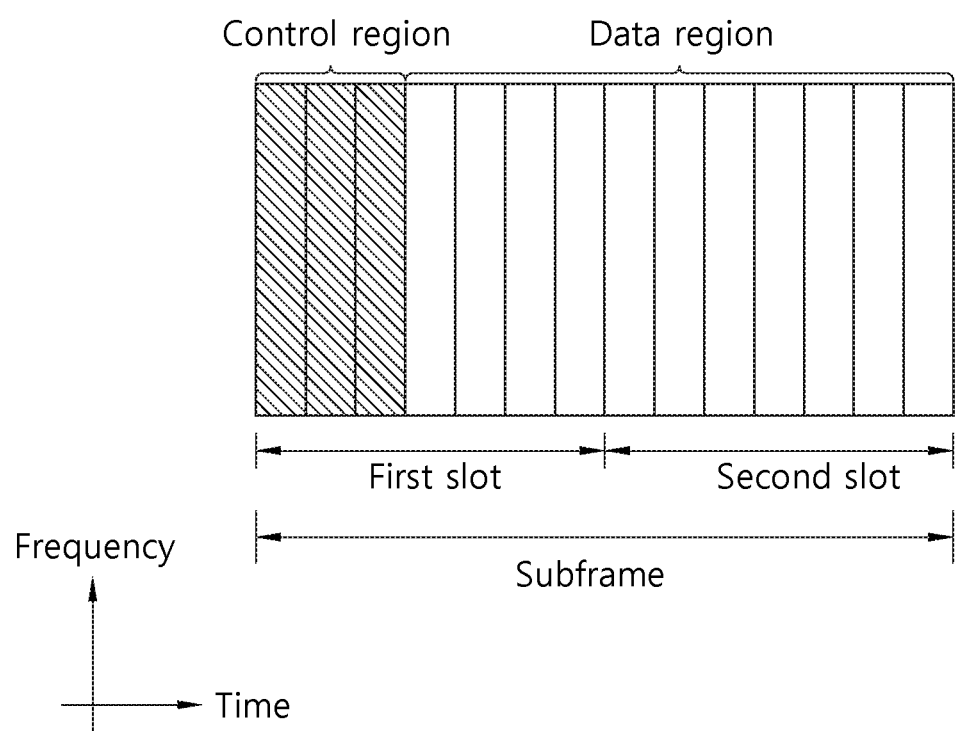
FIG. 3 illustrates the architecture of a downlink subframe.

FIG. 3 illustrates the architecture of a downlink subframe.

In FIG. 3, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

<Discontinuous Reception (DRX)>

Hereinafter, discontinuous reception (DRX) in 3GPP LTE will be described.

The DRX allows a terminal to monitor a downlink channel discontinuously in order to reduce battery consumption of a radio device.

Figure 4:
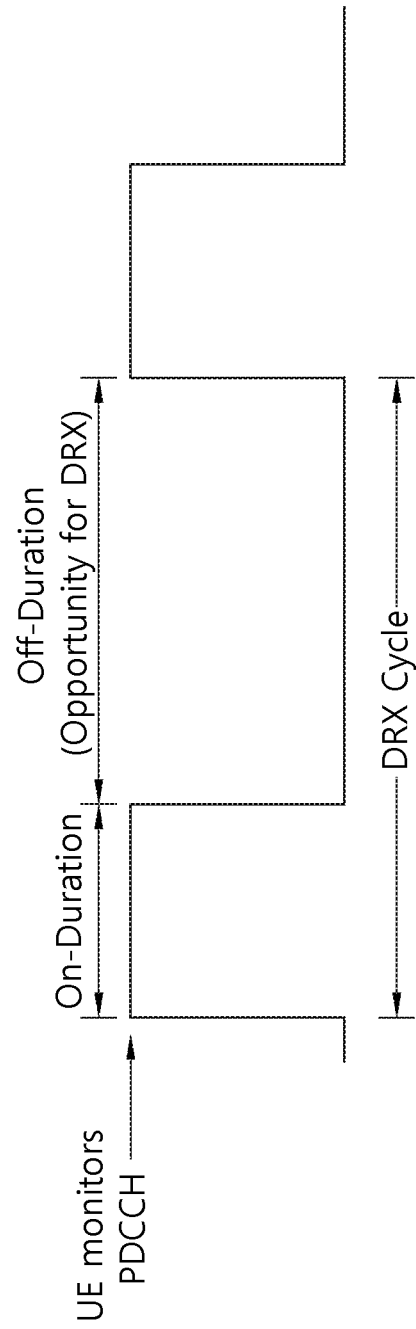
FIG. 4 illustrates an example of a DRX cycle.

FIG. 4 illustrates an example of a DRX cycle.

A DRX cycle specifies periodic repetition of On Duration followed by a possible period of inactivity. The DRX cycle includes On Duration and Off Duration. On Duration is a period of time in which a UE monitors a PDCCH in a DRX cycle.

Once DRX is set, a UE may monitor a PDCCH during On Duration but may not monitor a PDCCH during Off Duration.

To define On Duration, an onDuration timer is used. The On Duration may be defined as a period in which the onDuration timer is being operated. The onDuration timer specifies the number of consecutive PDCCH-subframe(s) at the beginning of the DRX cycle. A PDCCH-subframe indicates a subframe that is monitored by a PDCCH.

In addition to a DRX cycle, other periods in which a PDCCH is monitored may be defined. A time duration during which a PDCCH is monitored is collectively referred to as Active time. The Active time may consist of an On Duration during which an UE periodically monitors the PDCCH, and a time duration during which the UE monitors the PDCCH upon occurrence of an event.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

Hereinafter, the IoT will be described.

Figure 5A:
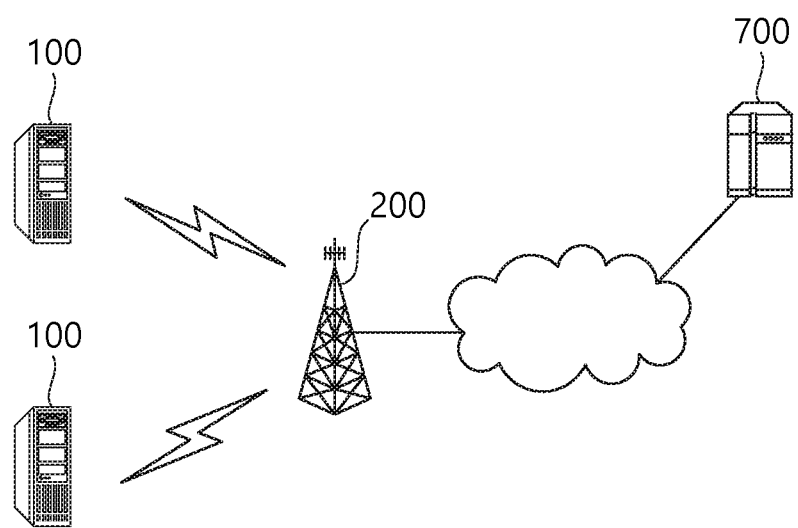
FIG. 5A illustrates an example of IoT (Internet of Things) communication.

FIG. 5A illustrates an example of IoT (Internet of Things) communication.

The IoT refers to information exchange between the IoT devices 100 without human interaction through the base station 200 or information exchange between the IoT device 100 and the server 700 through the base station 200. In this way, the IoT communication may be also referred to as Cellular Internet of Things (CIoT) in that it communicates with a cellular base station.

Such IoT communication is a type of machine-type communication (MTC). Therefore, the IoT device may be referred to as an MTC device.

The IoT service is distinct from the service in the conventional human intervention communication and may include various categories of services such as tracking, metering, payment, medical service, and remote control. For example, the IoT services may include meter reading, water level measurement, use of surveillance cameras, inventory reporting of vending machines, and so on.

Since the IoT communication has a small amount of data to be transmitted and uplink or downlink data transmission and reception rarely occur, it is desirable to lower the cost of the IoT device 100 and reduce battery consumption depending on a low data rate. Further, since the IoT device 100 has low mobility characteristics, the IoT device 100 has characteristics that the channel environment changes little.

Figure 5B:
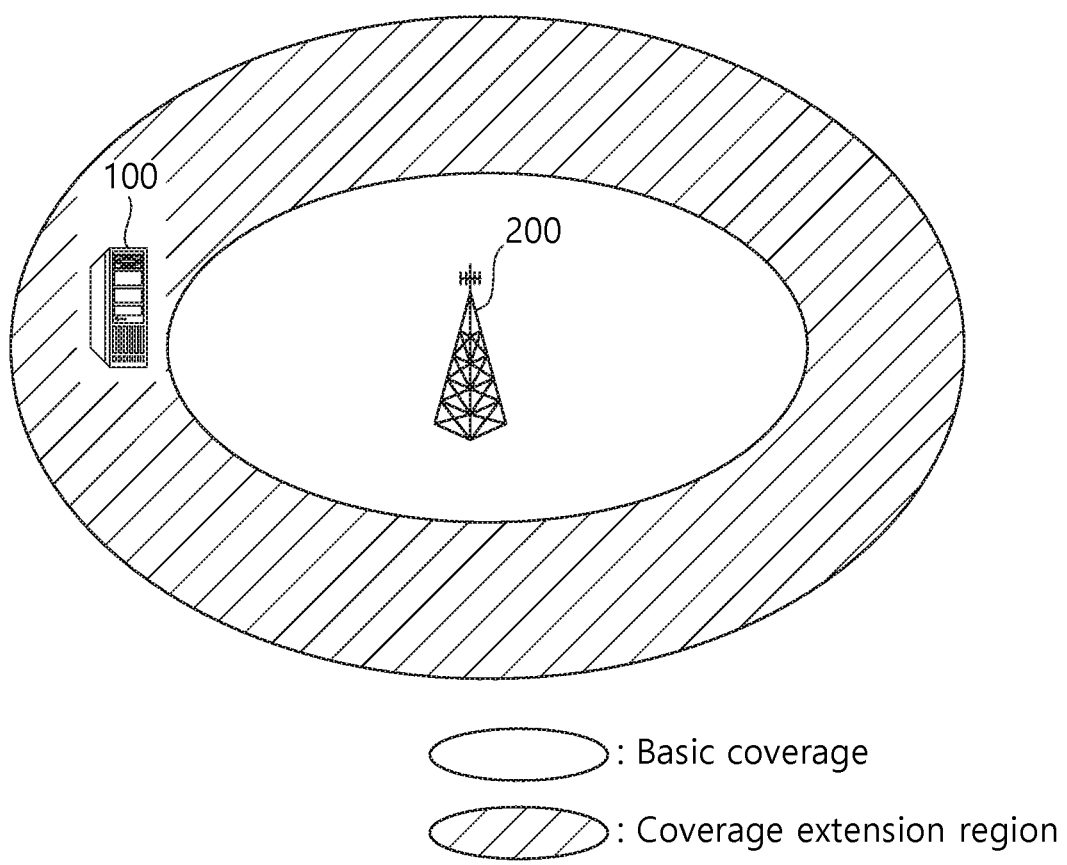
FIG. 5B is an illustration of cell coverage expansion or augmentation for an IoT device.

FIG. 5B is an illustration of cell coverage extension or enhancement for an IoT device.

Recently, extending or enhancing the cell coverage of the base station for the IoT device 100 has been considered, and various techniques for extending or enhancing the cell coverage have been discussed.

However, when the coverage of the cell is extended or enhanced, if the base station transmits a downlink channel to the IoT device located in the coverage extension (CE) or coverage enhancement (CE) region, then the IoT device has difficulty in receiving it. Similarly, when an IoT device located in the CE region transmits an uplink channel, the base station has difficulty in receiving it.

In order to solve this problem, a downlink channel or an uplink channel may be repeatedly transmitted over multiple subframes. Repeating the uplink/downlink channels on multiple subframes is referred to as bundle transmission.

Figure 5C:
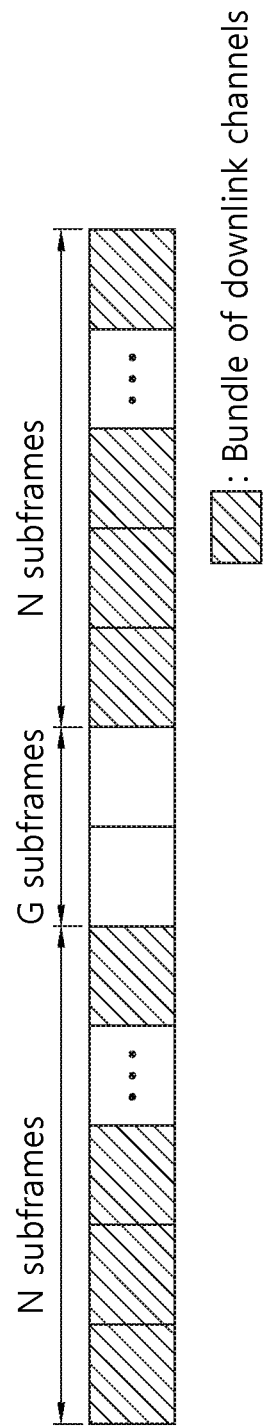
FIG. 5C illustrates an example of transmitting a bundle of downlink channels.

FIG. 5C illustrates an example of transmitting a bundle of downlink channels.

As illustrated in FIG. 5C, a base station repeatedly transmits a downlink channel (e.g., a PDCCH and/or a PDSCH) to an IoT device 100 located in a CE region on a plurality of subframes (e.g., N subframes).

The IoT device or the base station receives a bundle of downlink/uplink channels on a plurality of subframes and decodes a portion of the bundle or the entire bundle, thereby increasing the decoding success rate.

Figure 6A:
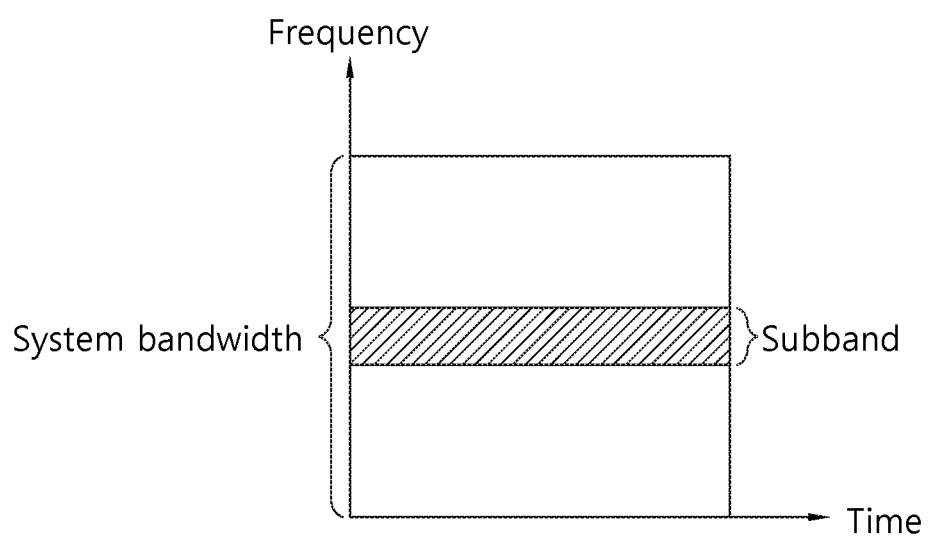
FIGS. 6A and 6B are diagrams illustrating examples of sub-bands in which IoT devices operate.
Figure 6B:
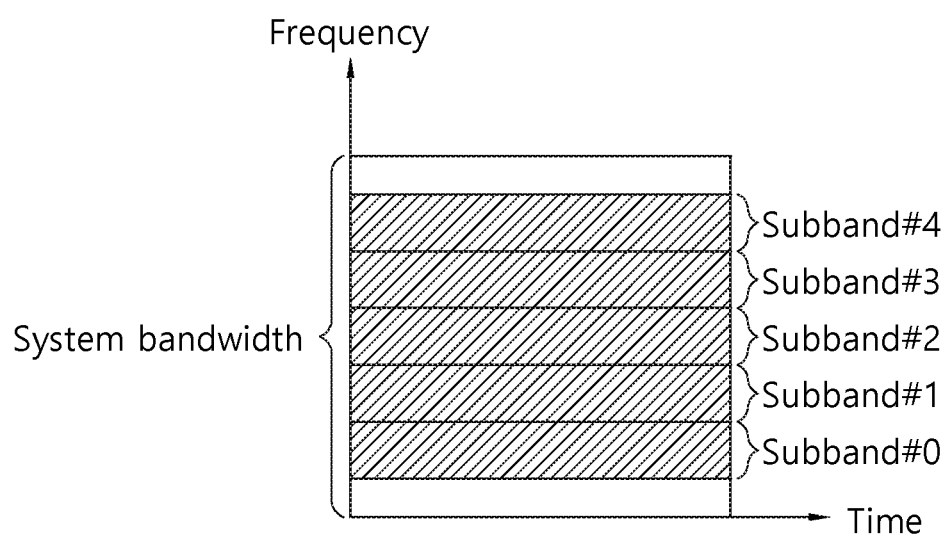

FIGS. 6A and 6B are diagrams illustrating examples of sub-bands in which IoT devices operate.

As one method for low-cost IoT devices, regardless of the system bandwidth of the cell as shown in FIG. 5A, the IoT device may use a sub-band of about 1.4 MHz for example.

In this case, an area of the subband in which the IoT device operates may be positioned in a central region (e.g., six middle PRBs) of the system bandwidth of the cell as shown in FIG. 5A.

Alternatively, as shown in FIG. 5B, a plurality of sub-bands of the IoT device may be used in one sub-frame for intra-subframe multiplexing between IoT devices to use different sub-bands between IoT devices. In this case, the majority of IoT devices may use sub-bands other than the central region of the system band of the cell (e.g., six middle PRBs).

The IoT communication operating on such a reduced bandwidth can be called NB (Narrow Band) IoT communication or NB CIoT communication.

Figure 7:
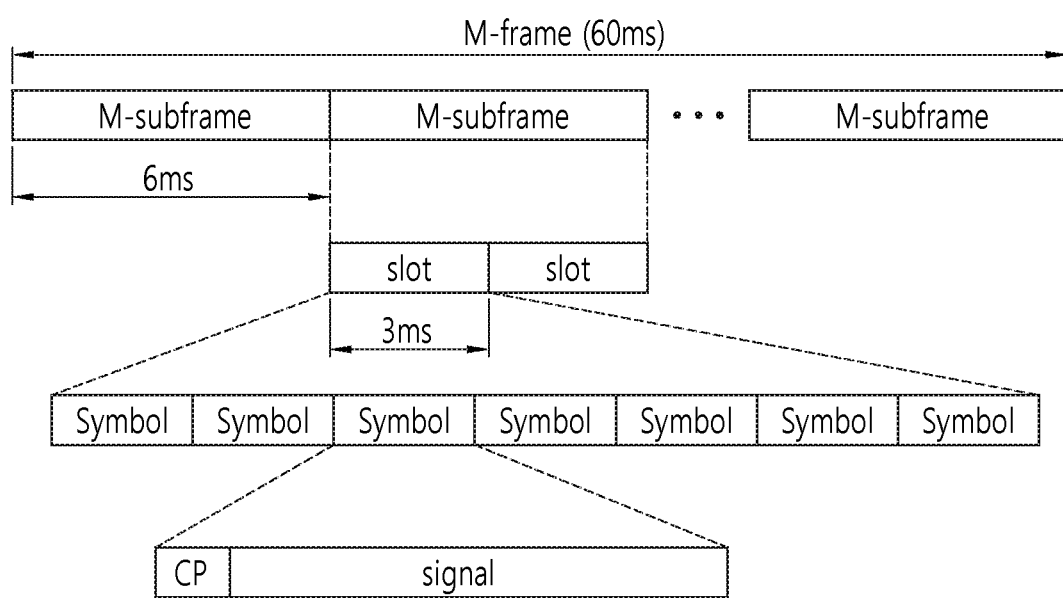
FIG. 7 illustrates an example of time resources that can be used for NB-IoT in M-frame units.

FIG. 7 illustrates an example of time resources that can be used for NB-IoT in M-frame units.

Referring to FIG. 7, a frame that may be used for the NB-IoT may be referred to as an M-frame, and the length may be illustratively 60 ms. Also, a subframe that may be used for the NB IoT may be referred to as an M-subframe, and the length may be illustratively 6 ms. Thus, an M-frame may include 10 M-subframes.

Each M-subframe may include two slots, and each slot may be illustratively 3 ms.

However, unlike what is shown in FIG. 7, a slot that may be used for the NB IoT may have a length of 2 ms, and thus the subframe has a length of 4 ms and the frame may have a length of 40 ms. This will be described in more detail with reference to FIG. 7.

Figure 8:
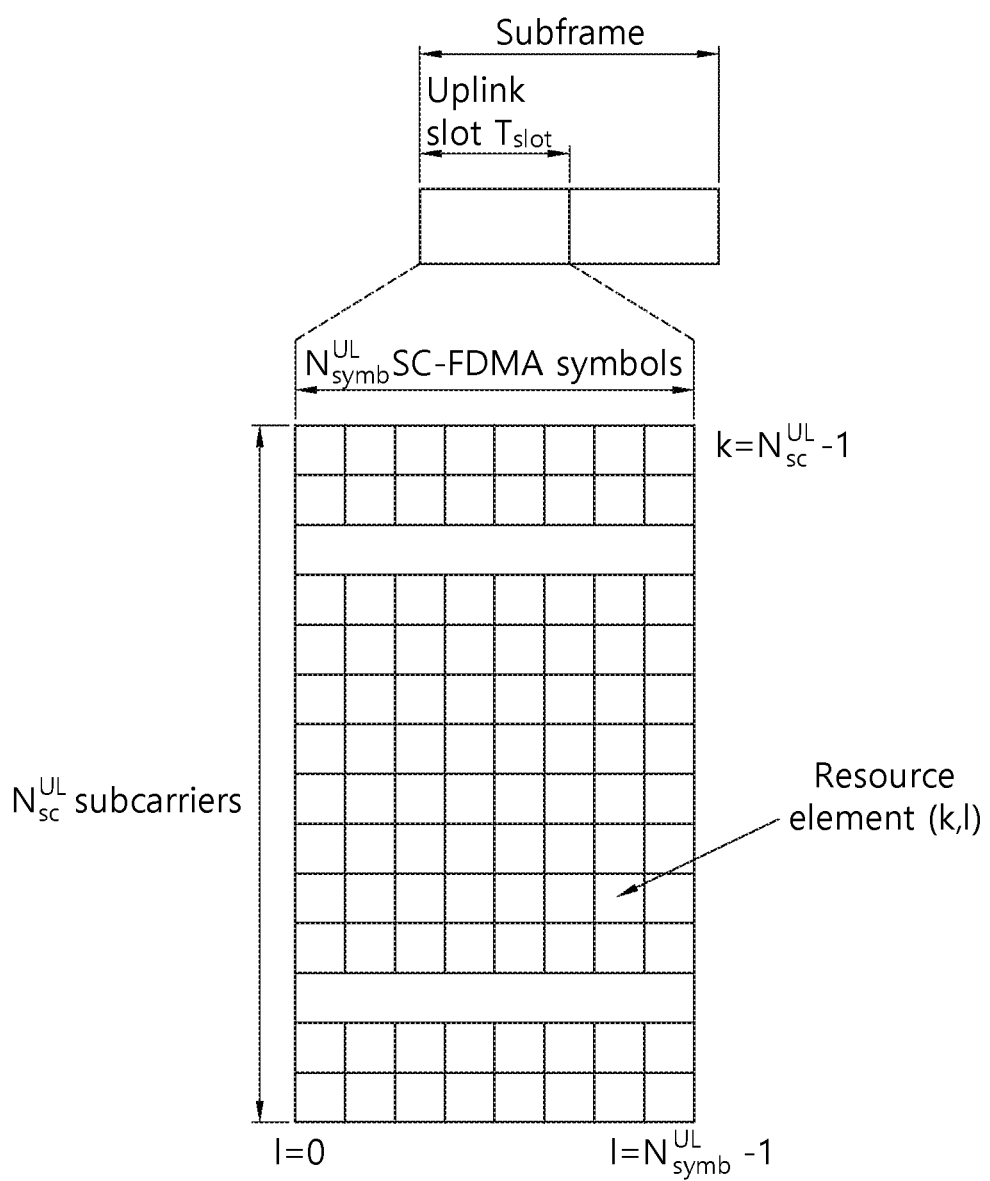
FIG. 8 is another illustration representing time resources and frequency resources that can be used for NB IoT.

FIG. 8 illustrates another example of time resources and frequency resources that can be used for NB IoT.

Referring to FIG. 8, a physical channel or a physical signal transmitted on a slot in an NB-IoT uplink includes $N_{symb}^{UL}$ SC-FDMA symbols in the time domain and $N_{sc}^{UL}$ subcarriers in the frequency domain. The uplink physical channel may be divided into a narrowband physical uplink shared channel (NPUSCH) and a narrowband physical random access channel (NPRACH). In NB-IoT, the physical signal may be a narrowband demodulation reference signal (NDMRS).

In NB-IoT, an uplink bandwidth for $N_{sc}^{UL}$ subcarriers for $T_{slot}$ is illustrated as below.

TABLE 1

| Subcarrier spacing | $N_{sc}^{UL}$ | $T_{slot}$ |
|---|---|---|
| $\Delta f = 3.75$ kHz | 48 | $61440 * T_s$ |
| $\Delta f = 15$ kHz | 12 | $15360 * T_s$ |

In NB-IoT, each resource element (RE) in a resource grid may be defined as an index pair (k, l) in a slot when the time domain and the frequency domain indicate k=0, ..., $N_{sc}^{UL}-1$ and l=0, ..., $N_{symb}^{UL}-1$, respectively. In NB-IoT, a downlink physical channel includes a narrowband physical downlink shared channel (NPDSCH), a narrowband physical broadcast channel (NPBCH), and a narrowband physical downlink control channel (NPDCCH). A downlink physical signal includes a narrowband reference signal (NRS), a narrowband synchronization signal (NSS), and a narrowband positioning reference signal (NPRS). The NSS includes a narrowband primary synchronization signal (NPSS) and a narrowband secondary synchronization signal (NSSS).

NB-IoT is a communication method for a wireless device using a reduced bandwidth (i.e., a narrowband) according to low complexity and low cost. NB-IoT communication is aimed at enabling a large number of wireless devices to be connected in the reduced bandwidth. Further, NB-IoT communication is aimed at supporting wider cell coverage than that in existing LTE communication.

Referring to Table 1, a carrier having a reduced bandwidth includes only one PRB when the subcarrier spacing is 15 kHz. That is, NB-IoT communication may be performed using only one PRB. Here, assuming that an NPSS/NSSS/NPBCH/SIB-NB is transmitted from a base station, a PRB that a wireless device access in order to receive the NPSS/NSSS/NPBCH/SIB-NB may be referred to as an anchor PRB (or anchor carrier). The wireless device may be allocated an additional PRB by the base station in addition to the anchor PRB (or anchor carrier). Here, among the additional PRBs, a PRB via which the wireless device does not expect to receive the NPSS/NSSS/NPBCH/SIB-NB from the base station may be referred to as a non-anchor PRB (or non-anchor carrier).

<Power Saving>

A general UE blind-decodes a PDCCH in on periods according to discontinuous reception (DRX). However, NB-IoT devices may not frequently transmit/receive data due to characteristics thereof. Accordingly, it may be inefficient to frequently monitor a PDCCH even in on periods according to DRX. To maximize energy efficiency, NB-IoT devices may be configured to receive a PDCCH or other downlink signals only after reception of a power saving signal (or a wake-up signal (WUS)).

Figure 9:
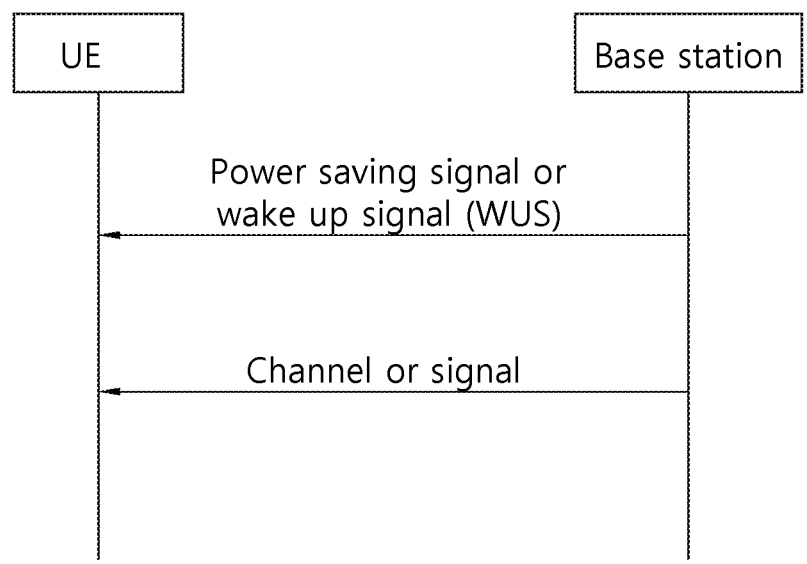
FIG. 9 is a flowchart illustrating an example of using a power saving signal (or WUS).

FIG. 9 is a flowchart illustrating an example of using a power saving signal (or WUS).

As can be ascertained with reference to FIG. 9, a base station may transmit a power saving signal (or WUS) before transmission of a PDCCH (or an MPDCCH or an NPDCCH). When the power saving signal (or WUS) is received, an NB-IoT device can monitor the PDCCH (or MPDCCH or NPDCCH).

<Disclosures of Present Specification>

The present specification defines a basic transmission unit of a monitored power saving signal (or WUS) in advance in order for an NB-IoT device to determine whether to receive a specific signal or channel and proposes operations involved therein.

The power saving signal (or WUS) defined in the present specification can be transmitted for the purpose of indicating whether a specific signal or channel intended by the base station will be transmitted or information on a low payload before the base station transmits the specific signal or channel. The power saving signal (or WUS) can be used for the purpose of reducing power consumption required to monitor a specific signal or channel. Specifically, when repetition of a specific signal or channel is required for an NB-IoT device or an MTC device, the device can monitor the power saving signal (or WUS) repeated a smaller number of times instead of monitoring the channel repeated a larger number of times every time to prevent unnecessary power consumption. Further, the power saving signal may be used to transmit information while performing synchronization on time/frequency within a shorter time by replacing a synchronization signal necessary to monitor a specific signal or channel. The power saving signal (or WUS) may be used to reduce overhead necessary to transmit a specific signal or channel by designating a duration in the time/frequency domain in which the specific signal or channel is transmitted.

Although the present specification will be described focusing on NB-IoT below, it is obvious that description of the power saving signal (or WUS) in the present specification can be equally applied to general communication systems.

I. First Disclosure

According to a first disclosure, a basic transmission unit in the time/frequency domain in which a power saving signal (or WUS) is transmitted is defined as a power saving signal (or WUS) unit. Here, a single power saving signal (or WUS) unit may be composed of N power saving signals (or WUSs). Here, transmission of all power saving signals (or WUSs) may be composed of one or more power saving signal (or WUS) units.

A basic transmission unit in the time domain for the power saving signal (or WUS) may include, for example, a single symbol, a single slot or a single subframe. Alternatively, the basic transmission unit in the time domain may include, for example, a plurality of symbols, a plurality of slots or a plurality of subframes. Specifically, a power saving signal (or WUS) unit may be defined as a transmission unit composed of N subframes in NB-IoT.

A basic transmission unit in the frequency domain for the power saving signal (or WUS) may be, for example, a unit represented by a subcarrier, a carrier or a PRB. For example, a power saving signal (or WUS) unit may be represented by M PRBs.

The transmission units in the time/frequency domains for the power saving signal (or WUS) may be represented, for example, by combinations of a symbol, a slot or a subframes/a subcarrier, a carrier or a PRB.

A power saving signal (or WUS) unit may be determined for the purpose of determining a unit for representing information. For example, it may be used to indicate that the information is a signal corresponding to a specific base station or NT-IoT device, such as a cell ID or an NB-IoT device identifier (e.g., a UE ID). Further, the power saving signal (or WUS) may be used for the purpose of designating a unit in which inter-cell interference randomization is performed. For example, the power saving signal (or WUS) unit may be used for application of scrambling or orthogonal cover code (OCC).

Figure 10A:
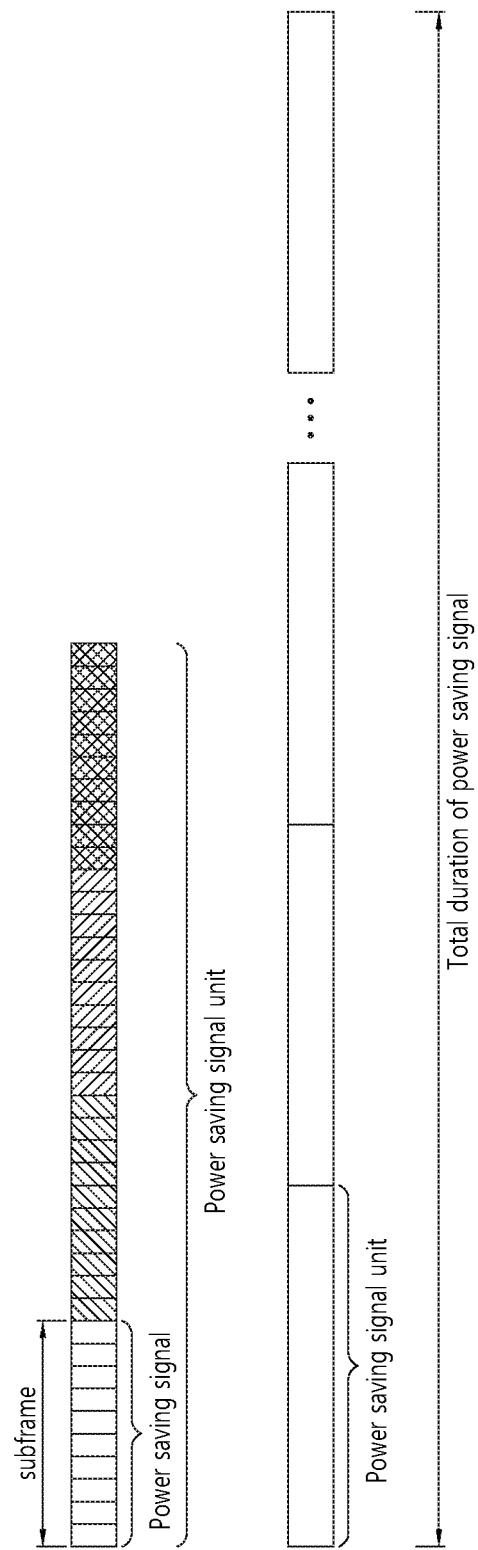
FIG. 10A is an illustration representing an example of a power saving signal (or WUS) according to a first disclosure.

FIG. 10A is an illustration representing an example of a power saving signal (or WUS) according to the first disclosure.

As illustrated in FIG. 10A, a plurality of saving signals (or WUSs) can be aggregated to form a power saving signal (or WUS) unit. The unit composed of a plurality of power saving signals (or WUSs) can be repeatedly transmitted.

The power saving signal (or WUS) unit can be used to represent an actual transmission duration. When a maximum transmission length for power saving signal (or WUS) transmission is defined as a maximum duration, a base station can determine the maximum duration and notify NB-IoT devices of the maximum duration. On the other hand, a duration of power saving signals (or WUSs) actually transmitted by the base station may be shorter than the maximum duration. For example, when a specific NB-IoT device is present at a position having a high signal intensity in the coverage of the base station, the base station can transmit power saving signals (or WUSs) in a shorter length than the maximum duration in order to reduce overhead caused by power saving signal (or WUS) transmission. The aforementioned length can be defined as an actual transmission duration. Here, the NB-IoT device may not ascertain information about the actual transmission duration. In this case, the NB-IoT device needs to blind-detect/decode whether a power saving signal (or WUS) is transmitted in a duration in which the power saving signal (or WUS) can be transmitted based on the maximum duration. If the actual duration can be composed of a minimum power saving signal (or WUS) unit (e.g., a subframe), the NB-IoT device may need to perform blind detection/decoding based on each minimum unit. This operation may increase power consumption of the NB-IoT device and deteriorate detection/decoding performance according to implementation. To prevent this, the actual transmission duration is determined based on the power saving signal (or WUS) unit in this section.

Figure 10B:
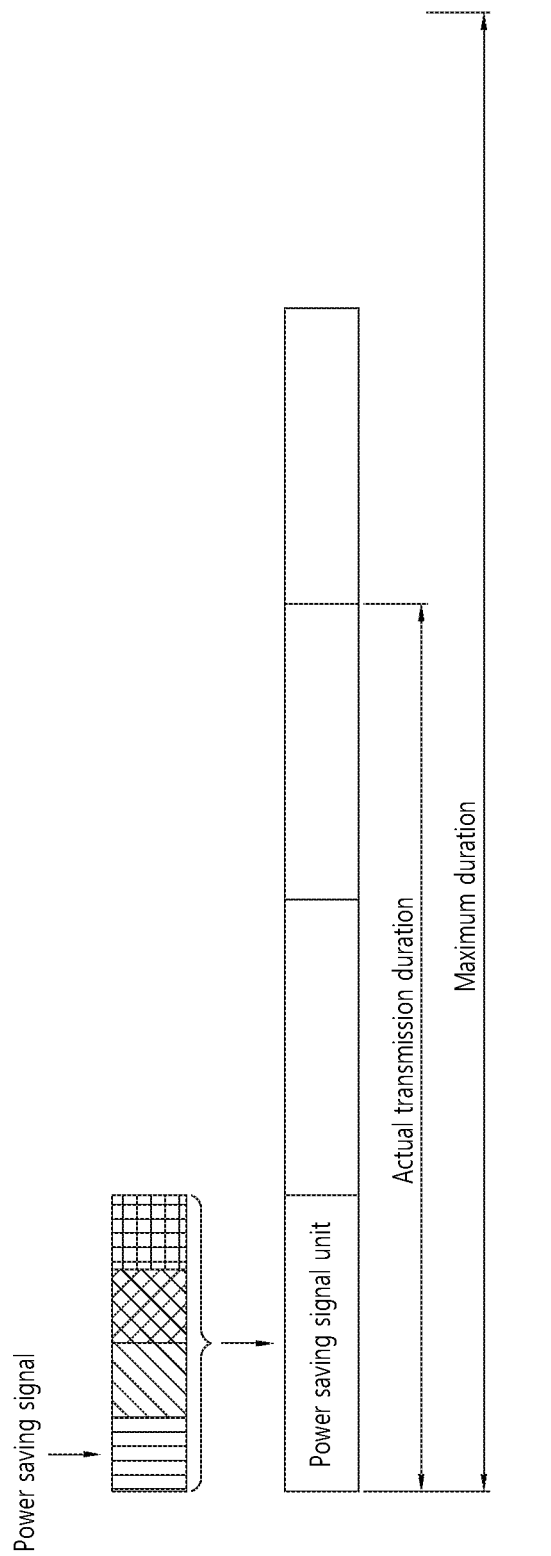
FIG. 10B is an illustration representing an example of an actual transmission period of a power saving signal (or WUS) according to the first disclosure.

FIG. 10B is an illustration representing an example of an actual transmission duration of a power saving signal (or WUS) according to the first disclosure.

In this case, the NB-IoT device cannot ascertain a correct actual transmission duration but can ascertain that transmission is performed based on the power saving signal (or WUS) unit and determine the power saving signal (or WUS) unit as a criterion for blind detection/decoding.

I-1. First Method of First Disclosure

According to a first method of the first disclosure, a power saving signal (or WUS) unit size can be configured by a base station.

The power saving signal (or WUS) unit size can be determined based on a minimum unit of repetition and the number of pieces of information that can be represented using a power saving signal (or WUS). Accordingly, a suitable power saving signal (or WUS) unit size may vary according to situations. For this, the first method proposes that a power saving signal (or WUS) unit size is configured by a base station.

Figure 11:
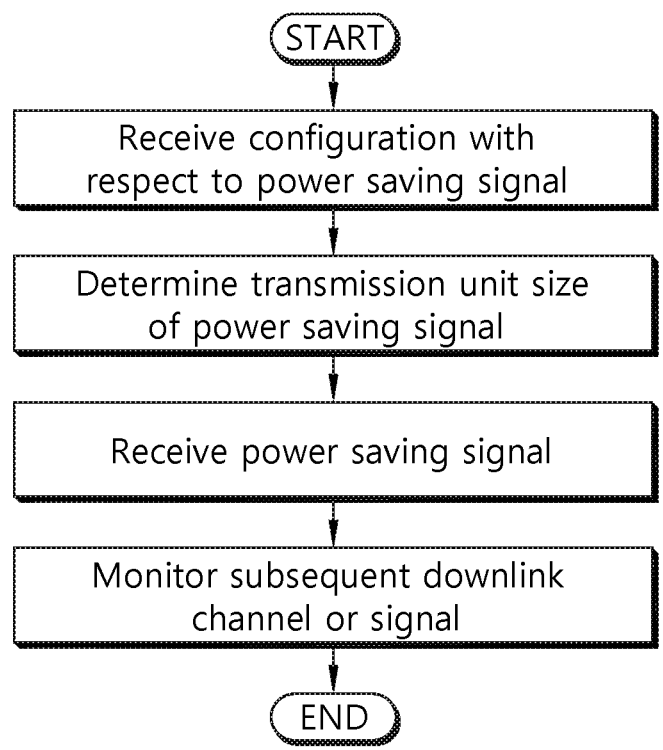
FIG. 11 is a flowchart illustrating an exemplary procedure according to a first method of the first disclosure.

FIG. 11 is a flowchart illustrating an exemplary procedure according to the first method of the first disclosure.

Referring to FIG. 11, a wireless device receives configuration information with respect to a power saving signal.

The wireless device determines a transmission unit size of the power saving signal based on the configuration information.

The wireless device receives a power saving signal from a serving cell based on the determined transmission unit size.

Then, the wireless device can monitor a subsequent downlink channel or downlink signal based on reception of the power saving signal.

If the size of a frequency domain resource in which an NB-IoT device monitors a power saving signal (or WUS) is fixed, a configured power saving signal (or WUS) unit size can refer to the size of a time domain resource. On the other hand, if the size of a frequency domain resource in which an NB-IoT device monitors a power saving signal (or WUS) is not fixed, a power saving signal (or WUS) unit size can be configured based on a pair of a frequency domain resource size and a time domain resource size.

A power saving signal (or WUS) unit size can be set simultaneously with a size of information to be transmitted by a corresponding base station through a power saving signal (or WUS). For example, different power saving signal (or WUS) unit sizes can be determined when the number of pieces of information to be distinguished by a base station through a power saving signal (or WUS) is $K_1$ and when it is $K_2$.

Specifically, configuration information about a power saving signal (or WUS) unit can be transmitted through higher layer signaling such as SIB or RRC signaling. Here, a method in which a predefined size of L power saving signal units is indicated by K bits can be used. Here, L and K satisfy $L \leq 2^K$.

Specifically, when a power saving signal dedicated for MTC or a WUS dedicated for MTC (hereinafter referred to as am MWUS) is used, for example, a PRB size of the dedicated power saving signal (or MWUS) can be determined by the size of information to be transmitted by a base station using the dedicated power saving signal (or MWUS) (e.g., a sub-group for identifying an MCT device identifier (i.e., UE ID/MTC device group ID (i.e., UE group ID)). The dedicated power saving signal (or MWUS) unit size corresponds to the PRB size. If the base station does not support sub-grouping, the the dedicated power saving signal (or MWUS) unit size can be determined as 2 PRBs. On the other hand, when the base station supports sub-grouping, the dedicated power saving signal (or MWUS) unit size can be determined as a PRB. Here, when the unit size is 1 PRB, the device can ascertain that sub-grouping is applied. When supporting of sub-grouping is indicated to the device, the device can ascertain that the unit size of the dedicated power saving signal (or MWUS) to be monitored thereby is 1 PRB.

When the device has sub-grouping capability, the above description can be applied. However, when the device does not have sub-grouping capability, the device can assume that the unit size is fixed.

I-2. Second Method of First Disclosure

According to a second method, a power saving signal (or WUS) unit size can be determined based on parameter values for other purposes.

Resource sizes in the time/frequency domains necessary for transmission of a power saving signal (or WUS) can be determined in accordance with target requirements of a signal or channel corresponding thereto. For example, in the case of a power saving signal (or WUS) for determining whether paging will be monitored, a repetition size necessary for power saving signal (or WUS) transmission can be proportional to an NPDCCH (or MPDCCH) repetition size. In the case of a power saving signal (or WUS) for determining whether paging will be monitored in MTC, a frequency domain resource size of the power saving signal (or WUS) can be proportional to an MPDCCH repetition size.

Considering the above-described situations, a power saving signal (or WUS) unit size can be determined depending on some parameters exchanged between a base station and an NB-IoT device. For example, a power saving signal (or WUS) unit size can be determined by a repetition level of a corresponding channel or signal indicated by the power saving signal (or WUS). Alternatively, a power saving signal (or WUS) unit size can be determined by a resource size in the frequency domain in which a corresponding channel or signal indicated by the power saving signal (or WUS) is transmitted. Specifically, the size of a PRB in which an MPDCCH is transmitted can be a criterion in the case of MTC.

If a power saving signal (or WUS) unit is determined or configured by only a resource size in the frequency domain, (1) a resource size in the time domain can be determined in inverse proportion to resources in the frequency domain. This may be for the purpose of maintaining a maximum power saving signal (or WUS) unit based on a total size to maintain the amount of information to be transmitted. (2) Alternatively, the resource size in the time domain may be fixed or separately configured. In this case, the size of information that can be represented by the power saving signal (or WUS) unit may be determined by the size in the frequency domain in order to maintain detection performance.

I-2-1, First Example of Second Method

According to a first example, a power saving signal (or WUS) unit size can be calculated using a total power saving signal (or WUS) transmission length and the number of power saving signal (or WUS) units.

The power saving signal (or WUS) unit size can be calculated using the total power saving signal (or WUS) transmission length and the number of units. For example, when the total power saving signal (or WUS) duration is determined as T and the number of units is determined as M, the duration of each power saving signal (or WUS) unit can be determined as T/M. Here, when the power saving signal (or WUS) length is L, the number of power saving signals (or WUSs) constituting the power saving signal (or WUS) unit can be determined as T/M/L.

When the size of a window in which all power saving signals (or WUSs) can be transmitted is determined as a maximum duration and the size of a monitoring duration in which each NB-IoT device actually expects reception of a power saving signal (or WUS) is determined as an actual transmission duration shorter than the maximum duration, the maximum duration can be used as a criterion for calculation of the power saving signal (or WUS) unit size. Here, the actual transmission duration can be determined as a multiple of the power saving signal (or WUS) unit size. For example, when the maximum duration is determined as Tmax and the number of power saving signal (or WUS) units is determined as 4, an available actual transmission can be one of Tmax*¼, Tmax*²⁄₄, Tmax*¾, and Tmax.

The number of power saving signal (or WUS) units may be (1) determined as an appointed fixed value such that it is constant all the time, (2) determined based on a value configured by a base station for an NB-IoT device through higher layer signaling, or (3) determined based on a value determined according to a base power saving signal (or WUS) duration size.

I-2-2. Second Example of Second Method

A power saving signal (or WUS) unit size can be determined by a total power saving signal (or WUS) transmission length.

Specifically, the power saving signal (or WUS) unit size can be calculated using the total power saving signal (or WUS) transmission length. For example, when the total power saving signal (or WUS) duration is T, the power saving signal (or WUS) unit size can be determined by a predetermined rule. Here, the rule can be determined by the total power saving signal (or WUS) duration and a fixed ratio. Alternatively, the rule can be determined based on a table in which power saving signal (or WUS) unit sizes corresponding to all power saving signal (or WUS) durations are arranged.

When the total power saving signal (or WUS) transmission length is shorter than a specific length, a power saving signal (or WUS) unit size can be determined to be the same as the total power saving signal (or WUS) transmission length. This may be for the purpose of excluding the gain that can be obtained according to introduction of the unit because the gain is insignificant when the total power saving signal (or WUS) length is determined to be equal to or less than the specific length.

When the size of a window in which all power saving signals (or WUSs) can be transmitted is determined as the maximum duration and the size of a monitoring duration in which each NB-IoT device actually expects transmission of a power saving signal (or WUS) is determined as an actual transmission duration shorter than the maximum duration, the maximum duration can be used as a criterion for calculation of the power saving signal (or WUS) unit size.

II. Second Disclosure

When information of 1 bit or more is represented through a power saving signal (or WUS) unit, the information can be represented through a method of combining a plurality of power saving signals (WUSs) in the power saving signal (WUS) unit.

Figure 12:
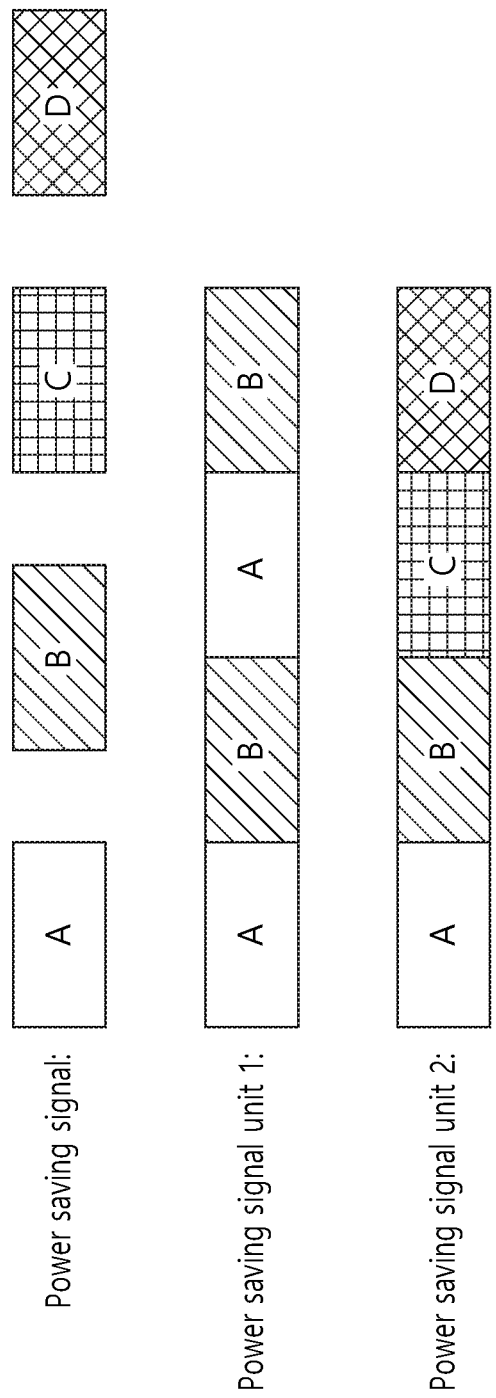
FIG. 12 illustrates an example of representing information through a combination of power saving signals (or WUS) according to a second disclosure.

FIG. 12 illustrates an example of representing information through a combination of power saving signals (or WUSs) according to the second disclosure.

As can be ascertained with reference to FIG. 12, when a plurality of power saving signal (or WUS) representation methods is present, the aforementioned information can be represented by selectively combining the plurality of methods by the unit size. A base station and an NB-IoT device can represent or acquire information to be transmitted/received through a method by which power saving signals (or WUSs) are combined.

For example, when N power saving signals (or WUSs) are configured as a single unit and the power saving signals (or WUSs) can distinguish M pieces of information, the power saving signal (or WUS) unit can represent a maximum of $M^N$ pieces of information.

The aforementioned information may include information for distinguishing an NB-IoT device identifier (i.e., UE ID)/group identifier (i.e., UE group ID) or a cell ID. This may be for the purpose of allowing an NB-IoT device to recognize whether a corresponding channel or signal corresponds thereto. Here, a method of combining power saving signals (or WUSs) constituting the power saving signal (or WUS) unit can use a random sequence form initialized using an NB-IoT device identifier (i.e., UE ID)/group identifier (i.e., UE group ID).

Alternatively, the aforementioned information may be information related to monitoring of a channel or signal corresponding to a power saving signal (or WUS). For example, the information related to monitoring of the corresponding channel or signal may include configuration information such as the positions, the number and the duration of paging occasions (POs) and a duration that need to be monitored by an NB-IoT device. This may be for the purpose of providing transmission information on a corresponding signal or channel to increase NB-IoT device power consumption reduction efficiency or reduce system overhead of the base station. Here, a method of combining a plurality of power saving signals (or WURs) in the unit can use a random sequence form initialized using a predefined information index value.

Figure 13:
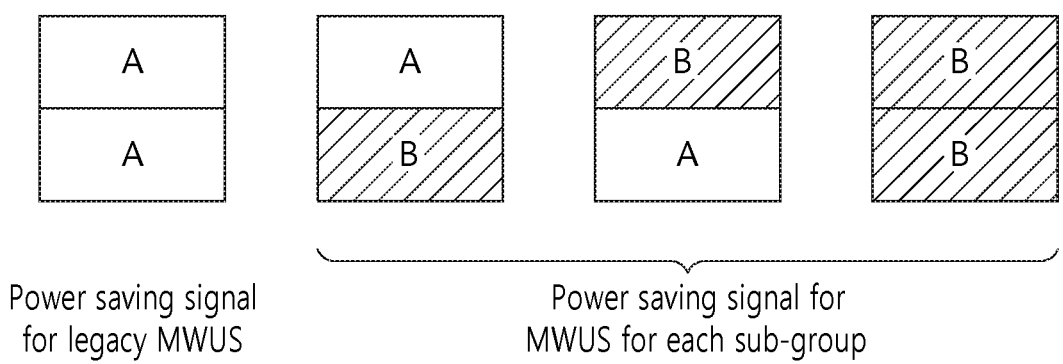
FIG. 13 illustrates an example of information that can be represented by an MWUS according to the second disclosure when the MWUS is used for MTC.

FIG. 13 illustrates an example of information that can be represented using an MWUS according to the second disclosure when the MWUS is used for MTC.

Referring to FIG. 13, when a power saving signal or an MWUS dedicated for MTC is used, information can be represented using a combination of a pair of MWUS signals each having a size of 1 PRB which are respectively mapped to 2 PRBs. If the corresponding information is for supporting sub-grouping, information for supporting all MTC devices irrespective of sub-grouping can be used as available information. For this, a form in which a specific WUS is repeated for 2 PRBs can be used, which may be the same as a transmission form of an MWUS used by a device having no sub-grouping capability.

As illustrated in FIG. 13, backward compatibility may be secured for a device having no capability with respect to a sub-group.

III. Third Disclosure

A single power saving signal (or WUS) unit may be configured in such a manner that a single power saving signal (or WUS) is repeated multiple times. Here, when information of 1 bit or more is represented using the power saving signal (or WUS) unit, cover code can be used to distinguish information.

Figure 14:
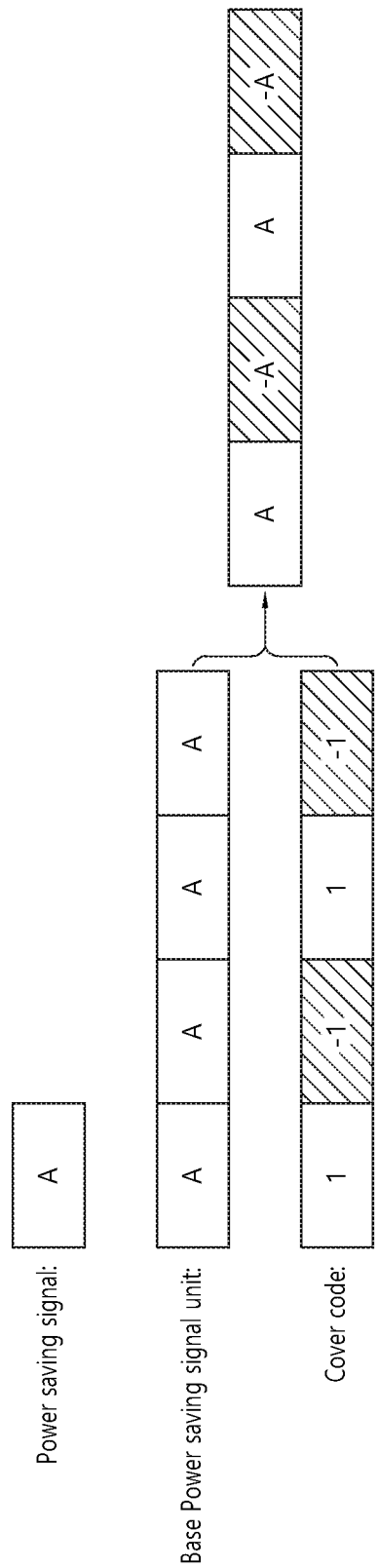
FIG. 14 is an illustration representing a method of configuring a unit of a power saving signal (or WUS) using cover code according to a third disclosure.

FIG. 14 is an illustration representing a method of configuring a power saving signal (or WUS) unit using cover code according to a third disclosure.

As illustrated in FIG. 14, the third disclosure handles a case in which power saving signals (or WUSs) constituting a single power saving signal (or WUS) unit are identical. Cover code in units of power saving signal (or WUS) can be applied within a power saving signal (or WUS) unit to represent information.

The information described in third disclosure may include information for distinguishing an NB-IoT device identifier (i.e., UE ID) or group identifier (i.e., UE group ID) or distinguishing a cell ID. This may be for the purpose of allowing an NB-IoT device to recognize whether a corresponding signal or channel corresponds thereto. Here, a method of selecting the index of cover code constituting a power saving signal (or WUS) unit can use a random sequence form initialized using an NB-IoT device identifier (i.e., UE ID) or group identifier (i.e., UE group ID).

The information described in the third disclosure may include information related to monitoring of a channel or signal corresponding to a power saving signal (or WUS). The information related to monitoring of the corresponding channel or signal may include, for example, configuration information such as the positions, number and duration of paging occasions (POs) that need to be monitored by an NB-IoT device. This may be for the purpose of providing transmission information on a corresponding signal or channel to increase NB-IoT device power consumption reduction efficiency or reduce system overhead of a base station. Here, a method of selecting the index of cover code constituting a power saving signal (or WUR) unit can use a random sequence form initialized using a predefined information index value.

To additionally configure information other than the information represented using cover code, a method of selecting power saving signals (or WUSs) included in a power saving signal unit may be provided. For example, one of a plurality of power saving signals (or WUSs) may be selected and repeated in the unit in order to represent an NB-IoT device identifier (i.e., UE ID), a group identifier (i.e., UE group ID) and/or a cell ID.

Figure 15:
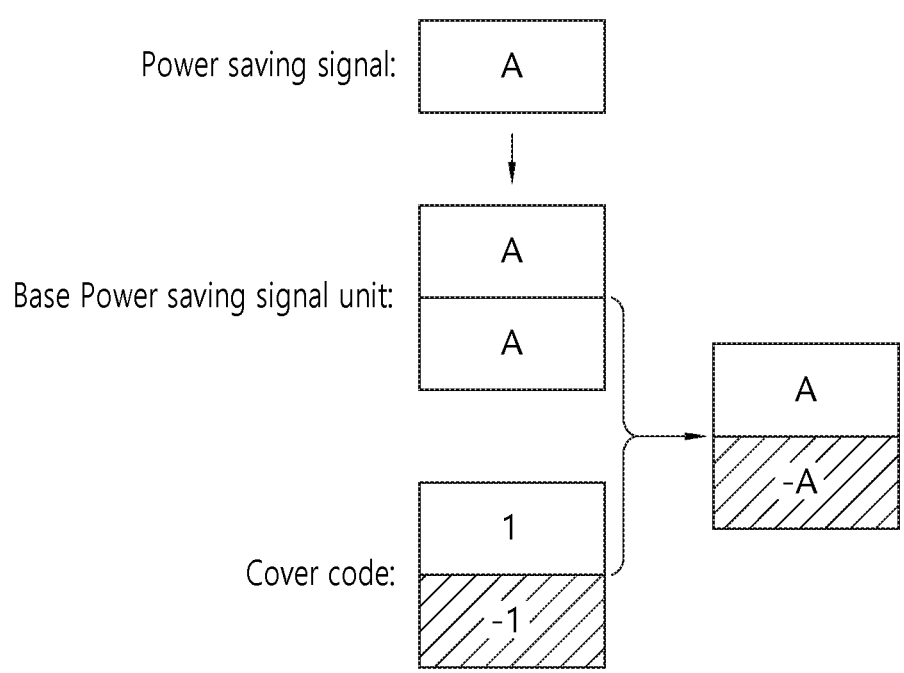
FIG. 15 illustrates an example of information that can be represented by an MWUS using cover code according to the third disclosure when the MWUS is used for MTC.

FIG. 15 illustrates an example of information that can be represented by an MWUS using cover code according to the third disclosure when the MWUS is used for MTC.

For example, when an MWUS is used for MTC, an MWUS having a size of 2 PRBs can be mapped to 2 PRBs using length-2 cover code. If corresponding information is for supporting sub-grouping, at least one cover code may be [1,1] in order to provide information for all devices irrespective of sub-grouping. Here, cover code for sub-grouping can be generated using available a value by excluding [1,1] from the form of [1,exp(j2πα)] (e.g. [1,−1], [1,j], [1, −j], and the like). If the corresponding information is for supporting sub-grouping, at least one cover code may be [S, S] in order to provide information for all devices irrespective of sub-grouping. Here, cover code for sub-grouping may have a form of [S, S*] (Here, S refers the original signal and S* refers to S to which conjugate operation has been applied).

IV. Fourth Disclosure

A total power saving signal (or WUS) transmission size is determined by a scaling factor, and when a set of scaling factors that can be set is present in the form of a list, values of scaling factors included in the list can be differently interpreted according to NB-IoT device characteristics.

A total power saving signal (or WUS) transmission size may be a value configured by a base station. As a specific method, a total power saving signal (or WUS) transmission size can be calculated by multiplying a repetition number of a channel indicated by a power saving signal (or WUS) by a scaling factor. Here, a scaling factor value can be transmitted by a base station through higher layer signaling such as SIB or RRC signaling in such manner that a value is selected from a predetermined list. For example, the corresponding signaling may have a size of N bits and can represent a maximum of $2^N$ states.

The size of a scaling factor that an NB-IoT device requires or needs to conform to in the aforementioned situation may depend on the NB-IoT device. For example, NB-IoT devices having different capabilities may require different magnitudes of power saving signal (or WUS), and different scaling power values may need to be configured therefor. As another example, an NB-IoT device which will be enhanced in the future may use scaling factor values different from previous ones.

A method of differently interpreting a scaling factor list according to NB-IoT device characteristics in consideration of the above-described characteristics is proposed in this section. The NB-IoT device characteristics may include NB-IoT device capability, NB-IoT device release information, NB-IoT device category, and the like.

IV-1. First Exemplary Method of Fourth Disclosure

According to a first exemplary method of the fourth disclosure, some states in a list may be used for a spare state.

A scaling factor is used to obtain a base power saving signal (or WUS) transmission length, and when a set of values that can be configured as scaling factors is present in the form of a list, some values in the list can be defined as spare states. Here, a spare state refers to a state reserved for supporting NB-IoT devices which will be enhanced in the future or reserved for supporting NB-IoT devices having enhanced capability or NB-IoT devices in other categories.

One or more spare states may be present in the list. Here, the states may mean the same information or different types of information.

For example, when 3 bits are used to indicate a scaling factor, a list representing scaling factor information can include a total of 8 states which may be {½, ¼, ⅛, ¹⁄₁₆, ¹⁄₃₂, ¹⁄₆₄, spare1, spare2}.

If information transmitted by a base station indicates a spare state in a situation in which a specific NB-IoT device determines a scaling factor based on a scaling factor list including spare states, the NB-IoT device can operate according to one of options below.

(Option 4-1-a) The NB-IoT device determines that a power saving signal (or WUS) is disabled when a spare state is indicated. This may be for the purpose of allowing a base station to apply the power saving signal (or WUS) to only NB-IoT devices having a specific characteristic. Here, in the case of NB-IoT devices which refer to different scaling factor lists while receiving the same information, the indication information may include information about scaling factors that are not spare states.

(Option 4-1-b) The NB-IoT device can apply a scaling factor defined as default when a spare state is indicated. This is for the purpose of allowing a base station to support a power saving signal (or WUS) for all NB-IoT devices that expect the power saving signal (or WUS) and to indicate specialized information to some NB-IoT devices. Here, a basic power saving signal (or WUS) operation can be guaranteed for NB-IoT devices which refer to a list including spare states through the default scaling factor. Here, the value defined as default may be (1) a fixed value predetermined by standards. Alternatively, the value defined as default may be (2) a value configured through higher layer signaling such as SIB or RRC signaling. When the value is configured through higher layer signaling, an indication field indicating a scaling factor can be included in higher layer signaling (e.g., SIB22-NB) for transmitting configuration information per carrier, for example. Further, an indication field indicating the default value can be included in higher layer signaling (e.g., SIB2-NB) for transmitting configuration per cell. As a specific example, the scaling factor defined as a default value may be one of values present in the list. That is, the default value can be determined by 1-bit indication for allowing one of a maximum value and a minimum value in the list to be selected.

IV-2. Second Exemplary Method of Fourth Disclosure

Some states in the list can indicate the same scaling factor values.

A scaling factor is used to obtain a base power saving signal (or WUS) transmission length, and when a set of values that can be used to determine scaling factors is present in the form of a list, some states in the list can indicate the same value. Some of states indicating the same value can be corrected for NB-IoT devices which will be enhanced in the future. Further, some of states indicating the same value can be corrected in order to support NB-IoT devices having enhanced capability in the future or NB-IoT devices in other categories.

For example, when 3 bits are used to indicate a scaling factor, a list representing information of scaling factors can include a total of 8 states which may be {½, ¼, ⅛, ¹⁄₁₆, ¹⁄₃₂, ¹⁄₆₄, ½, ¹⁄₆₄}.

The above-described embodiments of this specification can be realized through various means. For example, embodiments of this specification can be realized by hardware, firmware, software, or a combination thereof. Specifically, this will be described with reference to the drawings.

Figure 16:
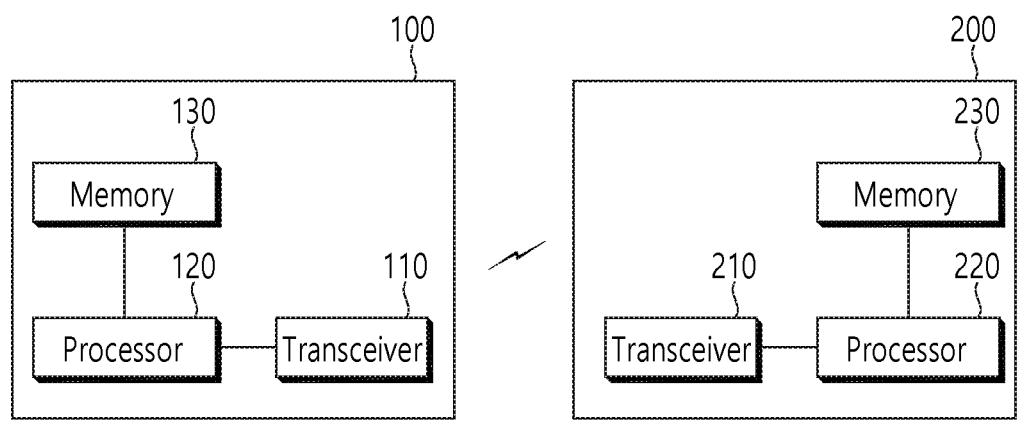
FIG. 16 is a block diagram illustrating a wireless device and a base station to implement the disclosures of the present specification.

FIG. 16 is a block diagram illustrating a wireless device and a base station to implement the disclosures of the present specification.

Referring to FIG. 16, the wireless device 100 and the base station may implement the disclosures of the present specification.

The wireless device 100 includes a processor 101, a memory 102, and a transceiver 103. Likewise, the base station 200 includes a processor 201, a memory 202, and a transceiver 203. The processors 101 and 201, the memories 102 and 202, and the transceivers 103 and 203 may each be configured as a separate chip, or at least two blocks/functions may be configured as a single chip.

The transceivers 103 and 203 include a transmitter and a receiver. When a particular operation is performed, only one of the transmitter and the receiver may operate, or both the transmitter and the receiver may operate. The transceivers 103 and 203 may include one or more antennas to transmit and/or receive a radio signal. Further, the transceivers 103 and 203 may include an amplifier to amplify a reception signal and/or a transmission signal and a band pass filter for transmission on a particular frequency band.

The processors 101 and 201 may implement the functions, processes, and/or methods proposed in the present specification. The processors 101 and 201 may include an encoder and a decoder. For example, the processors 101 and 201 may operate according to the foregoing description. The processors 101 and 201 include an application-specific integrated circuit (ASIC), a separate chipset, a logic circuit, a data processor, and/or a converter to convert a baseband signal and a radio signal from one to the other.

The memories 102 and 202 may include a read-only memory (ROM), a random access memory (RAM), a flash memory, a memory card, a storage medium, and/or other storage devices.

Figure 17:
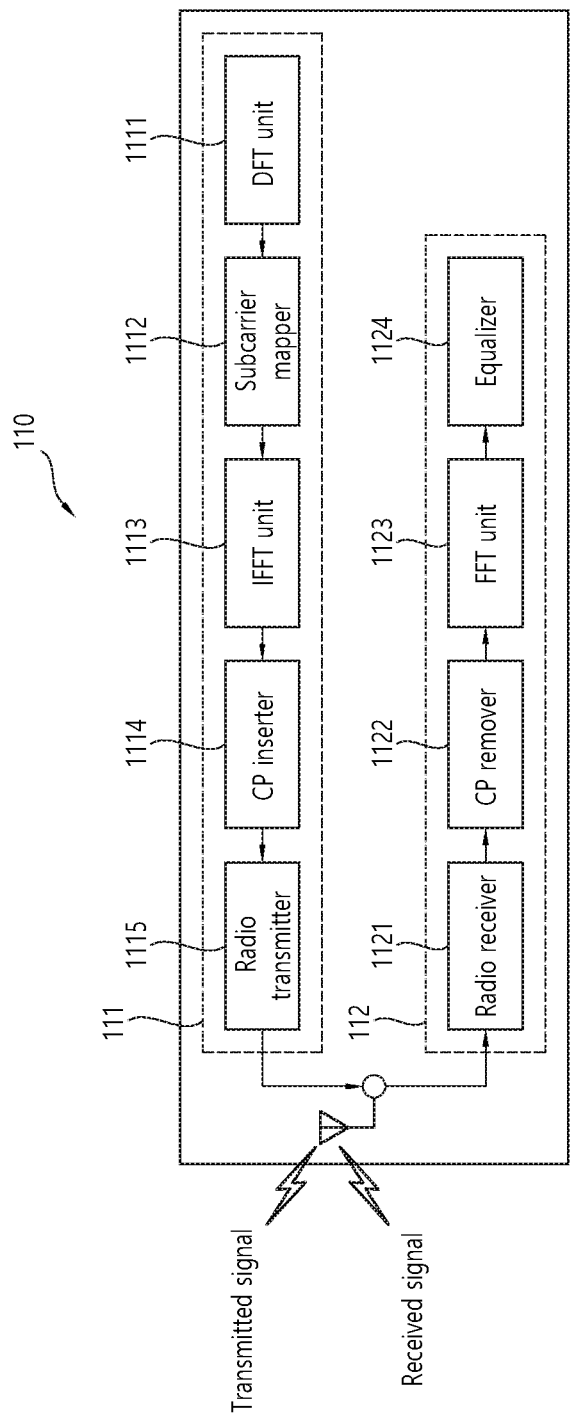
FIG. 17 is a block diagram specifically illustrating a transceiver of the wireless device illustrated in FIG. 16.

FIG. 17 is a block diagram specifically illustrating the transceiver of the wireless device illustrated in FIG. 16.

Referring to FIG. 17, the transceiver 110 includes a transmitter 111 and a receiver 112. The transmitter 111 includes a discrete Fourier transform (DFT) unit 1111, a subcarrier mapper 1112, an IFFT unit 1113, a CP inserter 1144, a radio transmitter 1115. The transmitter 111 may further include a modulator. Also, for example, the transmitter 111 may further include a scramble unit (not shown), a modulation mapper (not shown), a layer mapper (not shown), and a layer permutator (not shown), and these elements may be positioned before the DFT unit 1111. That is, in order to prevent an increase in the peak-to-average power ratio (PAPR), the transmitter 111 allows information to pass through the DFT unit 1111 before mapping a signal to a subcarrier. After performing subcarrier mapping of a signal, which is spread (or precoded, in the same sense) by the DFT unit 1111, through the subcarrier mapper 1112, the signal passes through the inverse fast Fourier transform (IFFT) unit 1113 into a signal on a time axis.

The DFT unit 1111 performs DFT on inputted symbols, thereby outputting complex-valued symbols. For example, when Ntx symbols are inputted (where Ntx is a natural number), a DFT size is equal to Ntx. The DFT unit 1111 may also be referred to as a transform precoder. The subcarrier mapper 1112 maps the complex-valued symbols to each subcarrier in the frequency domain. The complex-valued symbols may be mapped to resource elements corresponding to a resource block being assigned for data transmission. The subcarrier mapper 1112 may also be referred to as a resource element mapper. The IFFT unit 1113 performs IFFT on the inputted symbols, thereby outputting a baseband signal for data, which corresponds to a time-domain signal. The CP inserter 1114 duplicates an end part of the baseband signal for the data and inserts the duplicated part to a front part of the baseband signal for the data. By performing CP insertion, inter-symbol interference (ISI) and inter-carrier interference (ICI) may be prevented, thereby allowing orthogonality to be maintained even in a multi-path channel.

The receiver 112 includes a radio receiver 1121, a CP remover 1122, an FFT unit 1123, and an equalizer 1124. The radio receiver 1121, the CP remover 1122, and the FFT unit 1123 of the receiver 112 respectively perform the inverse functions of the radio transmitter 1115, the CP inserter 1114, and the IFFT unit 1113 of the transmitter 111. The receiver 112 may further include a demodulator.

What is claimed is:

1. A method for monitoring a downlink channel or a downlink signal, the method performed by a wireless device and comprising:
   receiving a power saving signal from a serving cell; and
   monitoring a subsequent downlink channel or a downlink signal based on reception of the power saving signal,
   wherein a transmission unit size of the power saving signal is determined based on configuration information, and the configuration information is received from the serving cell, and
   wherein the configuration information includes information representable by the power saving signal, including information about positions of paging occasions (POs), a number of the POs, and duration of the POs.

2. The method of claim 1, wherein the configuration information includes at least one of a number of repetitions of the power saving signal and a number of pieces of information representable by the power saving signal.

3. The method of claim 1, wherein the information representable by the power saving signal includes at least one of an identifier of the wireless device, a group identifier of the wireless device, and a cell identifier.

4. The method of claim 1, wherein cover code is applied to a transmission unit of the power saving signal.

5. The method of claim 1, further comprising:
   determining an actual transmission duration of the power saving signal based on the transmission unit of the power saving signal.

6. The method of claim 1, wherein the transmission unit of the power saving signal is determined based on a total transmission length of the power saving signal.

7. The method of claim 1, wherein the transmission unit of the power saving signal includes a plurality of power saving signals.

8. The method of claim 7, wherein cover code is applied to the plurality of power saving signals in the transmission unit.

9. A wireless device for monitoring a downlink channel or a downlink signal, comprising:
   a transceiver for receiving a power saving signal from a serving cell; and
   a processor for controlling the transceiver and monitoring a subsequent downlink channel or a downlink signal based on reception of the power saving signal,
   wherein a transmission unit size of the power saving signal is determined based on configuration information, and the configuration information is received from the serving cell, and
   wherein the configuration information includes information representable by the power saving signal, including information about positions of paging occasions (POs), a number of the POs, and duration of the POs.

10. The wireless device of claim 9, wherein the configuration information includes at least one of a number of repetitions of the power saving signal and a number of pieces of information representable by the power saving signal.

11. The wireless device of claim 9, wherein the information representable by the power saving signal includes at least one of an identifier of the wireless device, a group identifier of the wireless device, and a cell identifier.

12. The wireless device of claim 9, wherein cover code is applied to a transmission unit of the power saving signal.

13. The wireless device of claim 9, wherein the processor determines an actual transmission duration of the power saving signal based on the transmission unit of the power saving signal.

14. The wireless device of claim 9, wherein the transmission unit of the power saving signal is determined based on a total transmission length of the power saving signal.

* * * * *